April 26, 1949. F. GJEDEBO 2,468,660
EXTRACTION PROCESS FOR SEPARATING METALS
Filed Feb. 7, 1946

Inventor
Finn Gjedebo
By
C. F. Wenderoth
Attorney

Patented Apr. 26, 1949

2,468,660

UNITED STATES PATENT OFFICE 2,468,660

EXTRACTION PROCESS FOR SEPARATING METALS

Finn Gjedebo, Jorpeland, near Stavanger, Norway, assignor to Stavanger Electro-Staalverk Aktieselskap, Jorpeland, Norway Application February 7, 1946, Serial No. 646,170
In Norway August 21, 1944

Section 1, Public Law 690, August 8, 1946
Patent expires August 21, 1964

8 Claims. (Cl. 75—63)

This invention relates to a method for separation of mixtures of substances, where the mixture of substances is extracted by the use of an extraction solvent at elevated temperatures, whereafter the extracted substance is separated from the extraction solvent elsewhere at a lower temperature. The extraction is thus based on the fact that the solubility of the extracted substance in the dissolvent is considerably greater at elevated than at lower temperatures.

This method of extraction is very common, and may also easily be performed continuously by the use of appropriate technical arrangements, for instance the following: The extraction solvent is at an elevated temperature placed in contact with the mixture of substances, whereafter it is separated from the latter by filtration or separation of two layers of different specific weight. The extracted substance is now separated through refrigeration, whereupon the extraction solvent is returned to the place of extraction by using a pump or other mechanical means, it being heated on its way back or on arrival to the place of extraction, whereupon the play is repeated.

This invention relates to an especially advantageous method of accomplishing such a continuous process of extraction. The invention consists in using the difference of temperature which exists between different parts of the extraction solvent in the continuous cycle of extraction for the circulation of the extraction solvent by means of the principle of the thermosyphon.

Figure 2:
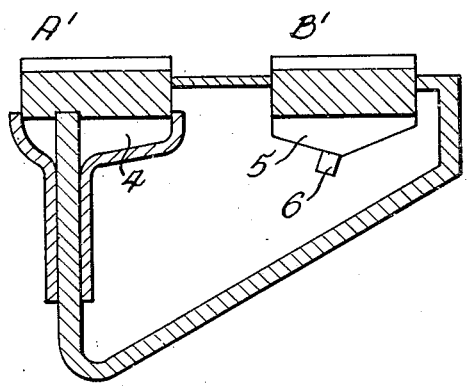
Fig. 2 is a similar view of a modification.
Figure 1:
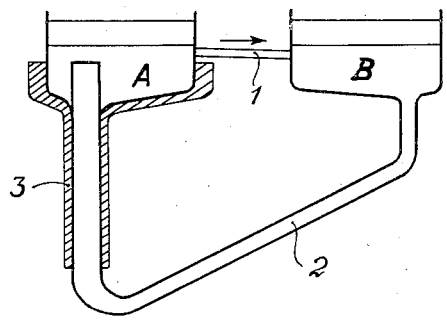
Fig. 1 is a diagrammatic view of one form of the invention.

The device includes a container A, in which the mixture of substances to be extracted is placed in contact with the extraction solvent. Further of a container B, preferably situated at the same level and in which the extracted substance is again separated, and two conduits, for instance tubes 1 and 2 situated at different levels, of which the lower tube 2 consists of one descending branch and one ascending branch, which opens directly below the upper layer of the container A. The ascending branch of the tube 2 is provided with heating means 3, for instance electrical elements of resistance of coils of induction, by the use of which the extraction solvent in the ascending branch and in the container A is heated. The drawing shows a case where the mixture of substances to be extracted is in a liquid state. At the elevated temperature prevailing in the container A the component to be extracted dissolves in the extraction solvent, which then flows through the tube 1 to the container B. At the lower temperature prevailing in the container B, the extracted substance is separated from the means of extraction and flows to the surface, owing to its lighter specific weight. Owing to its higher specific weight the extraction solvent which is cooled off, sinks through the right branch of the tube 2 and enters the left branch where it is again heated and so on.

As is readily realized, if the means of extraction is lighter of weight than the liquid to be extracted, it will be necessary to arrange the tubes in a different way, but the principle remains the same. Such an arrangement is illustrated in Fig. 2, where the means of extraction or solvent metal is shown by hatching. As shown it accumulates at the top of the containers A' and B'. Reference numeral 4 indicates the molten metal mixture and 5 indicates the extracted metal, which may be drawn off intermittently through a tube 6.

To obtain intimate contact between the extraction solvent and the mixture of substances to be extracted, the surfaces of contact might be made additionally extensive in making the containers of a large diameter compared with that of the tubes, while there is evidently no need for great depth, as shown in the drawing. Inlet and outlet are then arranged well apart.

Means to move the substances reciprocally might also be arranged where this is deemed necessary, taking into consideration that the substances must be given an opportunity to separate again from each other before the extraction solvent flows over to the container B. The invention is in principle applicable for all extractions of the kind mentioned in the introduction, but will naturally be especially adaptable to such cases where the difference of temperature between the different parts of the means of extraction is considerable. The difference of specific weight, which represents the moving power, will in such cases be especially great, and thereby the circulation correspondingly rapid.

Thus the method will for instance be suitable where the mixture of substances to be extracted is a mixture of metals and the extraction solvent and possibly also the solvent in the container B is a metal.

The invention is of course applicable too without change if the mixture is unbalanced so that the substance or the substances to be extracted are predominantly present, or the opposite, where the substances to be extracted constitute an inferior part of the mixture.

Example

In the container A is a melted mixture of which the main component is manganese and the rest Fe, C or the like, while the device otherwise is filled with melted bismuth, until the line of partition between the two substances is located above the outlet of the tube 1. The container A is kept heated to a temperature of 1100° C.

The melted bismuth will absorb the manganese in a dissolved state and the solution will flow through the tube 1 to the container B, while Fe, C and the like remains as insoluble in bismuth. On its way to the container B the temperature falls through radiation to 800°. At this temperature the dissolved manganese is separated and flows to the surface in the container B, whereafter the now more or less manganese-free bismuth sinks through the tube 2 owing to its greater specific weight and is heated by the heat elements 3 in the ascending branch of the tube, and once more in the container A contacts the mixture of manganese and the play is repeated. In using the device in this way one attains an automatic extraction by the use of a simple device which needs very little attention.

I claim:

1. The process for recovering a molten metal from a mixture thereof with another substance which comprises extracting said molten metal from said mixture by a molten solvent metal therefor to form a solution of said metal in said solvent metal, flowing said solution from said mixture, allowing the temperature of said flowed solution to become lowered whereby the extracted metal and the solvent metal separate and returning so separated solvent metal to the place of the extraction by thermosyphon action, and repeating the above steps.

2. A continuous process for recovering a metal from a molten mixture thereof with another substance, which comprises extracting within a vessel said molten metal from said mixture by passing a molten solvent metal therefor through said metal to be recovered, overflowing the solution of metals so formed from said vessel and passing it by gravity to a separation vessel, allowing the temperature of such solution to be lowered during such passage and allowing the extracted metal and the solvent metal to separate in said separation vessel, recovering the extraction metal from said separation vessel, allowing the solvent metal to flow by gravity down into a return passage leading into the lower end of a rising passage and heating the solvent metal within said rising passage whereby it rises into the mixtures within the extraction vessel, and the cycle is repeated.

3. A continuous process for refining a metal which comprises passing through said metal in molten condition thereof a molten solvent metal therefor which solvent metal at a high temperature of such passage forms a solution with the metal to be refined but does not dissolve impurities contained therein, passing the solution so formed and free of impurities through a channel into a separation vessel, cooling said solution during the passage through said channel to such temperature that when arrived into the separation vessel the metal to be refined separates from the solvent metal whereby two layers of molten metal are formed, allowing metal from the solvent metal layer to flow by gravity down into a return passage leading into the lower end of a rising passage and heating the solvent metal within said rising passage whereby it rises into the mixture within the extraction vessel and the cycle is repeated and recovering refined metal from the other layer formed within the separation vessel.

4. A process as claimed in claim 1 in which the metal to be recovered is manganese and the solvent metal is bismuth.

5. A process as claimed in claim 2 in which the metal to be recovered is manganese and the solvent metal is bismuth.

6. A process as claimed in claim 3 in which the metal to be refined is manganese containing iron and the solvent metal is bismuth.

7. A process as claimed in claim 3 in which the metal to be refined is manganese containing carbon and the solvent metal is bismuth.

8. A process as claimed in claim 3 in which the metal to be refined is manganese containing iron and carbon and the solvent metal is bismuth.

FINN GJEDEBO.

REFERENCES CITED

The following references are of record in the file of this patent:

UNITED STATES PATENTS

| Number | Name | Date |
|---|---|---|
| 1,422,421 | Cunningham | July 11, 1922 |
| 1,921,060 | Williams | Aug. 8, 1933 |
| 2,034,372 | Betterton et al. | Mar. 17, 1936 |
| 2,061,251 | Perkins | Nov. 17, 1936 |
| 2,079,344 | Geyer | May 4, 1937 |
| 2,173,136 | Randel | Sept. 19, 1939 |
| 2,204,180 | Gerlach | June 11, 1940 |
| 2,399,634 | Holland et al. | May 7, 1946 |